US011215114B1

(12) United States Patent
Karekar et al.

(10) Patent No.: US 11,215,114 B1
(45) Date of Patent: Jan. 4, 2022

(54) INTERNAL COMBUSTION ENGINE AND FASTENER

(71) Applicant: DEERE & COMPANY, Moline, IL (US)

(72) Inventors: Vaibhav Karekar, Pune (IN); Todd M. Willis, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/068,182

(22) Filed: Oct. 12, 2020

(51) Int. Cl.
*F02F 11/00* (2006.01)
*F01B 1/12* (2006.01)
*F16B 35/00* (2006.01)
*F02B 75/16* (2006.01)
*F02F 1/24* (2006.01)
*F02F 7/00* (2006.01)

(52) U.S. Cl.
CPC ................ *F02B 75/16* (2013.01); *F02F 1/24* (2013.01); *F02F 2007/0063* (2013.01)

(58) Field of Classification Search
CPC .......... F02F 11/00; F02F 7/0021; F02F 1/045; F02F 7/0085; F02F 7/0095; F02M 55/004; F02M 59/48; F02M 61/168; F01B 1/12; F16B 35/041; F16B 41/002; F16B 5/0208
See application file for complete search history.

(56) References Cited

U.S. PATENT DOCUMENTS 4,760,868 A * 8/1988 Saxon .................... F16L 55/136 138/89
4,975,008 A * 12/1990 Wagner .................... F02B 77/00 411/337
5,020,951 A * 6/1991 Smith ........................ F01L 1/46 411/107
5,094,579 A * 3/1992 Johnson .................. F02B 77/00 411/107
5,181,817 A * 1/1993 Anderson ............... F16B 5/025 411/369
6,371,073 B1 * 4/2002 Billimack ............... F02F 7/006 123/195 C
2001/0037787 A1 * 11/2001 Muller .................. F02F 7/0021 123/195 C
2002/0035983 A1 * 3/2002 Kobayashi ................ F01L 1/02 123/196 M
2004/0245772 A1 * 12/2004 Swim, Jr. .............. F16B 35/041 285/190
2005/0220564 A1 * 10/2005 Hinson .................. F16B 43/00 411/353
2008/0128207 A1 * 6/2008 Wilkins ............. F01M 11/0408 184/1.5

* cited by examiner

*Primary Examiner* — Long T Tran

(57) ABSTRACT

An internal combustion engine includes a block having at least one cylinder, a head joined to the block, a fastener coupling the head to the block and comprising a shank extending along a fastener axis between the block and the head, a fluid conduit extending parallel to the fastener axis and having an inner surface defined by the shank, and a seal fixed to the shank sealing the fluid conduit to prevent a fluid disposed in the fluid conduit from flowing across the seal in the fluid conduit.

19 Claims, 2 Drawing Sheets

INTERNAL COMBUSTION ENGINE AND FASTENER

BACKGROUND

Internal combustion engines include a cylinder block and a cylinder head that are coupled to each other using one or more cylinder head bolts. The valvetrain of the engine may include a high-pressure fluid, such as an oil or hydraulic fluid, that circulates in the head of the engine. Due to the structural complexities of the valvetrain and other components of the cylinder head, it is desirable that a fluid circuit efficiently convey the fluid in the cylinder head with such positioning and arrangement to maximize performance of the fluid circuit and minimize losses and the required space for the fluid circuit.

SUMMARY

Various aspects of examples of the present disclosure are set out in the claims.

In an embodiment, an internal combustion engine includes a block comprising at least one cylinder, a head joined to the block, a fastener coupling the head to the block and comprising a shank extending along a fastener axis between the block and the head, a fluid conduit extending parallel to the fastener axis and comprising an inner surface defined by the shank, and a seal fixed to the shank sealing the fluid conduit to prevent a fluid disposed in the fluid conduit from flowing across the seal in the fluid conduit.

The fluid conduit may be disposed in the head. The head may include a bore extending parallel to the fastener axis and defining an outer surface of the fluid conduit. The seal may extend between the inner surface and the outer surface to seal the fluid conduit. The seal may be formed onto the shank of the fastener. The seal may include an elastomeric material. The fastener may include a metal material. The seal may comprise a plurality of annular members formed integrally with the shank of the fastener. The fluid conduit may comprise a first fluid conduit end having a first pressure and a second fluid conduit end having a second pressure, the first pressure being higher than the second pressure, and wherein the seal may comprise at least one annular member oriented toward the first fluid conduit end. The fastener may be configured to be installed through the head in a direction opposite from a direction of orientation of the at least one annular member of the seal. The engine may further comprise a valvetrain, wherein the fluid conduit may comprise a valvetrain oil conduit for supplying oil to the valvetrain.

In an embodiment, a fastener includes a head portion disposed at a first end of the fastener, a second end disposed opposite from the first end, a shank disposed between the first end and the second end, extending along a fastener axis, and defining an inner surface of a fluid conduit extending parallel to the fastener axis, and a seal fixed to the shank and configured to seal the fluid conduit to prevent a fluid disposed in the fluid conduit from flowing across the seal in the fluid conduit.

The seal may be configured to seal against a bore extending parallel to the fastener axis and defining an outer surface of the fluid conduit.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
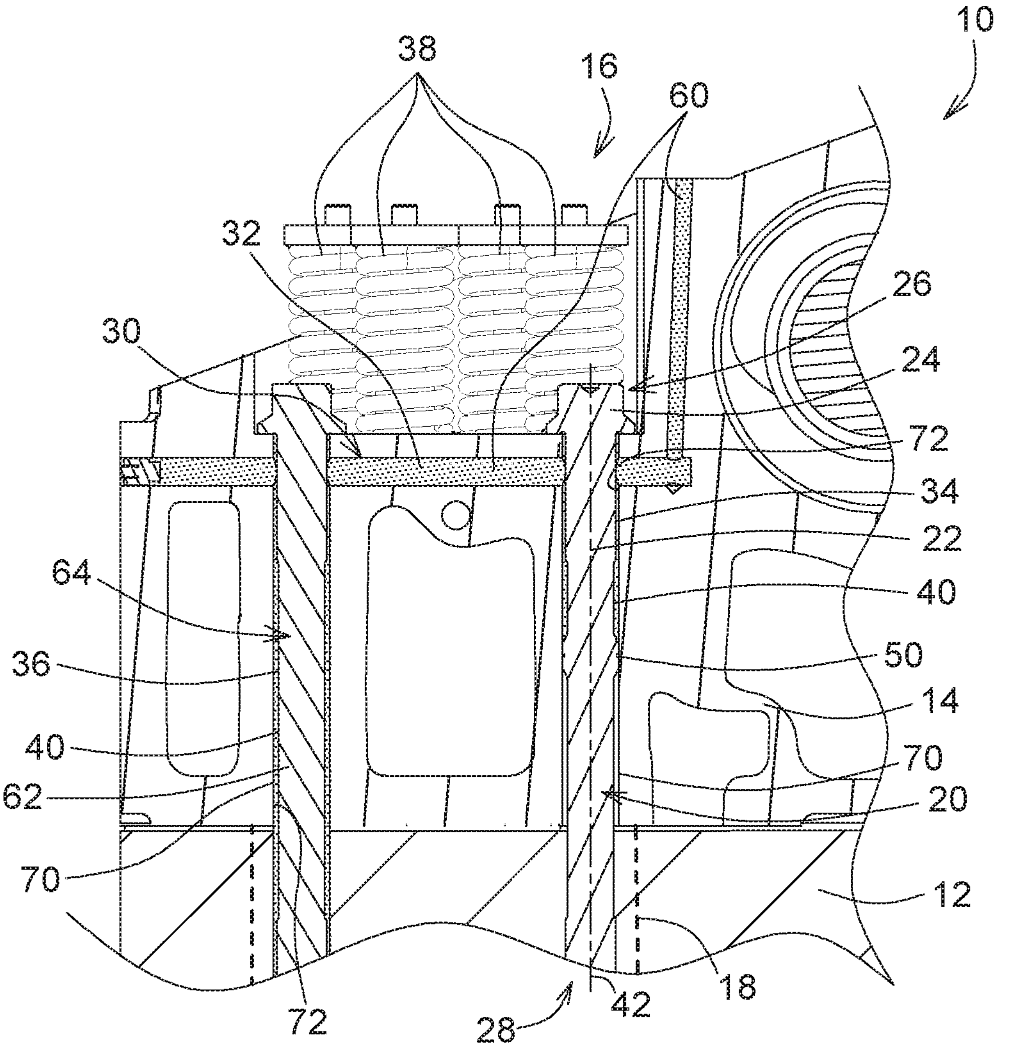
FIG. 1 is an enlarged cross-sectional view of an internal combustion engine in accordance with an embodiment of the present disclosure.
Figure 2:
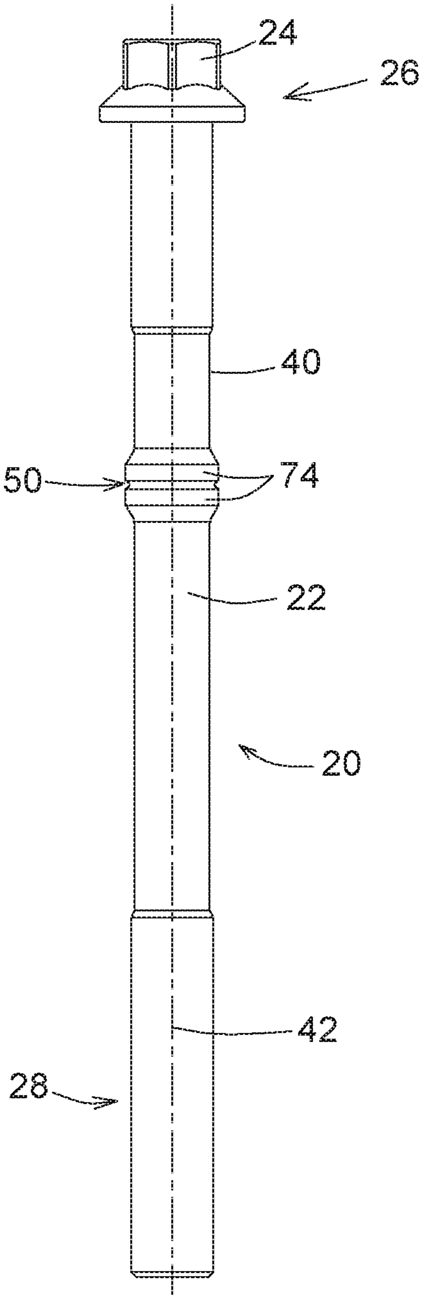
FIG. 2 is a side view of a fastener in accordance with an embodiment of the present disclosure.
Figure 3:
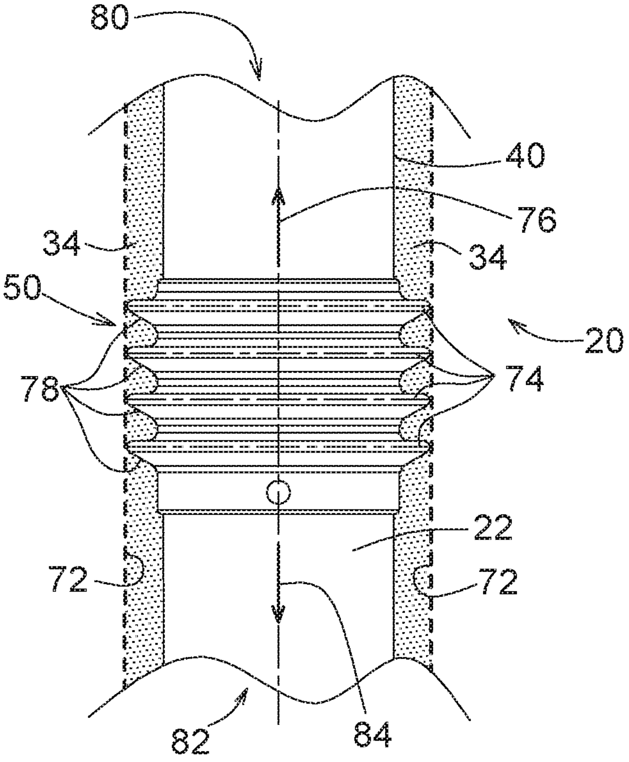
FIG. 3 is an enlarged side view of a fastener in accordance with an embodiment of the present disclosure.

At least one embodiment of the subject matter of this disclosure is understood by referring to FIGS. 1 through 3 of the drawings.

Referring now to FIG. 1, an enlarged cross-sectional view of an internal combustion engine 10 is shown in accordance with an embodiment of the present disclosure. The engine 10 includes a block 12 and a head 14 joined to the block 12. The block 12 further includes one or more cylinder(s) 18 having one or more piston(s) (not shown), and the engine 10 includes one or more intake and/or exhaust valves 38 in a valvetrain 16 of the engine 10. The engine 10 in the illustrated embodiment is a diesel engine but may include a gasoline or other type of engine in one or more additional embodiments.

The engine 10 of one or more embodiments further includes a fluid circuit 30 circulating or conveying a fluid 32 through the head 14, the block 12, and/or another portion of the engine 10. In the embodiment illustrated in FIG. 1, the fluid 32 is an oil, hydraulic fluid, or other lubricant or fluid and, more particularly, the fluid circuit 30 includes a valvetrain oil conduit for supplying valvetrain oil and/or hydraulic fluid to/from the valvetrain 16. The fluid circuit 30 of one or more embodiments includes a fluid conduit 34, as illustrated in FIG. 1. In the illustrated embodiment, the fluid circuit 34 extends in or at least partially through the head 14. In additional embodiments not illustrated, the fluid circuit 34 extends in or at least partially through the block 12 and/or another portion of the engine 10.

The engine 10 of one or more embodiments further includes one or more fastener(s) 20 coupling the head 14 to the block 12. In various embodiments of the fastener 20, the fastener 20 may couple two or more components that are not the head 14 and the block 12 or otherwise associated with the engine 10. The fastener 20 in the embodiment illustrated in FIG. 1 is a head bolt and/or another flanged or other bolt or screw in one or more embodiments. The fastener 20 of an embodiment includes a head portion 24 disposed at a first end 26 of the fastener 20. The fastener of an embodiment further includes a second end 28 disposed opposite the first end 26. The fastener 20 includes a shank 22 extending axially relative to the fastener 20 or along a fastener axis 42 between the block 12 and the head 14 in the illustrated embodiment. The shank 22 defines an inner surface 40 of the fluid conduit 34 extending axially relative to the fastener 20 or along the fastener axis 42. The head 14 includes a bore 70 extending parallel to the fastener axis 42 and defining an outer surface 72 of the fluid conduit 34. In other words, the parallel relationship between the bore 70 and the fastener axis 42 refers to the bore 70 having the same general orientation as the fastener axis 42.

The fluid conduit 34 of an embodiment is an annular or tube-shaped clearance, gap, or passageway that extends at least along the shank 22. The fluid circuit 30 includes one or more connected conduits 60 connecting to the fluid conduit 34 to convey the fluid 32 to or from the fluid conduit 34.

Further, as shown in FIG. 1, the engine 10 may include other fluid conduits 36, each having the inner surface 40 formed by a shank 62 of a non-sealing fastener 64.

The engine 10 and the fastener 20 of various embodiments further include a seal 50 fixed to the shank 22 sealing the fluid conduit 34 to prevent the fluid 32 disposed in the fluid conduit 34 from flowing across the seal 50 in the fluid conduit 34. As shown in FIG. 1, the seal 50 extends between the inner surface 40 and the outer surface 72 to seal the fluid conduit 34.

Reference is now made to FIG. 2, which illustrates an embodiment of the fastener 20 in accordance with an embodiment of the present disclosure. With the fastener 20 shown in FIG. 2, the seal 50 is formed onto the shank 22 of the fastener 20. In various embodiments, the seal 50 is over-molded onto the fastener 20. In one or more embodiments, the seal 50 includes an elastomeric material, such as rubber in a non-limiting example, that is molded onto the shank 22 of the fastener 20 such that the outside surface of the shank 22 serves as a mold to form the inside surface of the seal 50. In an embodiment, the shank 22 and/or another portion of the fastener includes a metal material, such as steel in a non-limiting example. The seal 50 of additional embodiments includes a metal, polymeric, composite, and/or ceramic material, or any combination thereof. Further, the shank 22 and at least part of or all of the seal 50 may be formed together or formed integrally from the same material in additional embodiments. In additional embodiments, the seal 50 is formed separately from the shank 22 or the fastener 20 and assembled with the fastener 20 to form a sealing relationship in the fluid conduit 34.

The seal 50 of FIG. 2 includes two annular members 74 extending circumferentially around the shank 22 or surrounding or encircling the shank 22. The seal 50 of FIG. 2 may include any number of annular members 74 and may further be formed integrally with the shank 22 of the fastener 20. Multiple annular members 74 are identical or differently shaped in embodiments, axially spaced an equal distance or spaced unequal distances from each other in embodiments, or oriented differently in embodiments.

Referring now to FIG. 3, an embodiment of the fastener 20 is shown that includes one or more annular member(s) 74 that is/are oriented in a first direction 76 or has/have an angled side 78 extending toward the first direction 76. As shown in FIG. 3, the fastener 20 of FIG. 3 is configured to be positioned in the fluid conduit 34 having a first fluid conduit end 80 having a first pressure and a second fluid conduit end 82 having a second pressure whereby the first pressure is higher than the second pressure. In a non-limiting example, the first fluid conduit end 80 includes or contain the fluid 34 being supplied or conveyed under pressure and the second fluid conduit end 82 does not include or contain the fluid 34 or includes or contains a fluid having a pressure less than the pressure of the fluid 34. The one or more annular member(s) 74 of the seal 50 are oriented toward the first fluid conduit end 82. The orientation improves sealing when the seal 50 is sealing the fluid 34 having high pressure.

The fastener 20 illustrated in FIG. 3 is configured to be installed into the outer surface 72, such as through the head 14 in an embodiment, in a second direction 84 that is opposite from the first direction 76 or the angled orientation of the annular member(s) 74 of the seal 50 shown in FIG. 3.

Without in any way limiting the scope, interpretation, or application of the claims appearing below, it will be appreciated that the engine 10 and/or the fastener 20 of various embodiments described herein provides an arrangement to seal the fluid conduit 34 to prevent undesirable fluid conveyance or leakage or to control a supply or conveyance of the fluid 32 in the fluid circuit 30 or in another portion of the engine 10. Further, the engine 10 and/or the fastener 20 provide an inexpensive and easily manufactured means to separate a flow of the fluid 32 in the fluid conduit 34 or provide multiple fluids around or along the fastener 20 without mixing or leakage between the fluids. Finally, the fastener 20 provides a sealing means using existing structures, such as the shank 22 of the fastener 20 and the bore 70 of the head 14, to minimize the required weight, cost, complexity, and manufacturing resources.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An internal combustion engine comprising:
- a block comprising at least one cylinder;
- a head joined to the block;
- a fastener coupling the head to the block and comprising a shank extending along a fastener axis between the block and the head;
- a fluid conduit extending parallel to the fastener axis and comprising an inner surface defined by the shank; and
- a seal fixed to the shank sealing the fluid conduit to prevent a fluid disposed in the fluid conduit from flowing across the seal in the fluid conduit.

2. The engine of claim 1, wherein the fluid conduit is disposed in the head.

3. The engine of claim 1, wherein the head comprises a bore extending parallel to the fastener axis and defining an outer surface of the fluid conduit.

4. The engine of claim 3, wherein the seal extends between the inner surface and the outer surface to seal the fluid conduit.

5. The engine of claim 1, wherein the seal is formed onto the shank of the fastener.

6. The engine of claim 5, wherein the seal comprises an elastomeric material.

7. The engine of claim 6, wherein the fastener comprises a metal material.

8. The engine of claim 1, wherein the seal comprises a plurality of annular members formed integrally with the shank of the fastener.

9. The engine of claim 1, wherein the fluid conduit comprises a first fluid conduit end having a first pressure and a second fluid conduit end having a second pressure, the first pressure being higher than the second pressure, and wherein the seal comprises at least one annular member oriented toward the first fluid conduit end.

10. The engine of claim 9, wherein the fastener is configured to be installed through the head in a direction opposite from a direction of orientation of the at least one annular member of the seal.

11. The engine of claim 1, further comprising a valvetrain, wherein the fluid conduit comprises a valvetrain oil conduit for supplying oil to the valvetrain.

12. A fastener comprising:

a head portion disposed at a first end of the fastener;

a second end disposed opposite from the first end;

a shank disposed between the first end and the second end, extending along a fastener axis, and defining an inner surface of a fluid conduit extending parallel to the fastener axis; and a seal fixed to the shank and configured to seal the fluid conduit to prevent a fluid disposed in the fluid conduit from flowing across the seal in the fluid conduit.

13. The fastener of claim 12, wherein the seal is configured to seal against a bore extending parallel to the fastener axis and defining an outer surface of the fluid conduit.

14. The fastener of claim 12, wherein the seal is formed onto the shank of the fastener.

15. The fastener of claim 12, wherein the seal comprises an elastomeric material.

16. The fastener of claim 12, wherein the fastener comprises a metal material.

17. The fastener of claim 12, wherein the seal comprises a plurality of annular members formed integrally with the shank of the fastener.

18. The fastener of claim 12, wherein the seal comprises at least one annular member configured to be oriented toward a fluid pressure source in the fluid conduit.

19. The fastener of claim 12, wherein the seal comprises at least one annular member configured to be oriented away from a direction of installation of the seal into the fluid conduit.

* * * * *